(12) United States Patent
Kramer

(10) Patent No.: US 6,719,655 B2
(45) Date of Patent: Apr. 13, 2004

(54) ELECTRODYNAMIC DRIVE SYSTEM

(75) Inventor: Jens Kramer, Langenargen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/278,124

(22) Filed: Oct. 21, 2002

(65) Prior Publication Data

US 2003/0078127 A1 Apr. 24, 2003

(30) Foreign Application Priority Data

Oct. 24, 2001 (DE) .......................... 101 52 472

(51) Int. Cl.$^7$ ................................................ B60K 6/02
(52) U.S. Cl. ........................ 475/5; 475/302; 180/65.2
(58) Field of Search ..................... 475/5, 207, 302, 475/303; 180/65.2; 290/45

(56) References Cited

U.S. PATENT DOCUMENTS

| | | | |
|---|---|---|---|
| 5,846,155 A | 12/1998 | Taniguchi et al. | 477/2 |
| 6,302,227 B1 | 10/2001 | Takemura et al. | 180/65.2 |
| 6,394,924 B1 * | 5/2002 | Schiebold et al. | 475/5 |
| 6,428,438 B1 * | 8/2002 | Bowen | 475/5 |
| 6,492,742 B1 * | 12/2002 | Fujikawa et al. | 290/40 C |
| 6,569,054 B2 * | 5/2003 | Kato | 477/5 |

FOREIGN PATENT DOCUMENTS

| | | | |
|---|---|---|---|
| DE | 196 29 235 A1 | 1/1997 | B60K/6/02 |
| DE | 100 02 133 A1 | 8/2000 | B60K/6/02 |
| DE | 199 21 064 A1 | 11/2000 | F16H/63/30 |
| DE | 199 34 696 A1 | 5/2001 | B60K/6/02 |
| DE | 199 62 854 A1 | 7/2001 | F16H/63/30 |
| EP | 1 209 017 A2 | 5/2002 | B60K/6/04 |

* cited by examiner

*Primary Examiner*—Ankur Parekh
(74) *Attorney, Agent, or Firm*—Davis & Bujold, PLLC

(57) ABSTRACT

An electrodynamic drive system (2) for a vehicle between a drive engine (4) and a manual transmission (16) comprising a planetary transmission (12) with the three elements sun gear (50), internal gear (10) and planet carrier (32), of which a first element (32) is connected to the manual transmission (16), a second element (10) is connected to the drive engine (4), and a third element (50) is connected to at least one electrical engine (22). A clutch (40) is provided with a first shift position, in which a rigid connection exists between the planet carrier (32) and the sun gear (50) for bridging the planetary transmission (12), and a second shift position in which the connection between the planet carrier (32) and the sun gear (50) is interrupted. The clutch (40) is provided with a third shift position, in which a rigid connection exists between the sun gear (50) and a stationary component of the housing (14), whereby a reduction in the speed of the drive engine (4) that corresponds to the transmission ratio of the planetary transmission (12) is achieved.

8 Claims, 2 Drawing Sheets

ELECTRODYNAMIC DRIVE SYSTEM

FIELD OF THE INVENTION

The invention relates to an electrodynamic drive system.

BACKGROUND OF THE INVENTION

Electrodynamic systems are suggested in various systems as assemblies between an internal combustion engine and a transmission in a vehicle.

In DE 199 34 696 A1, for example, an electrodynamic drive system for a vehicle is described, which is equipped with a planetary transmission positioned between a drive engine and a manual transmission, which comprises the three elements sun gear, internal gear, and planet carrier. The planet carrier, as the first element, is connected to the manual transmission; the internal gear, as the second element, is connected to the drive engine; and the sun gear, as the third element, is connected to an electric motor and to an electric eddy brake. This assembly allows the drive engine to be started, electrical power to be generated, power braking, and the vehicle to be started from a position of rest.

The object of the invention is to adjust the transmission of the gear ratios in the manual transmission in a vehicle that is equipped with an electrodynamic drive system.

The object is attained with an electrodynamic drive system having the characteristic features specified in claim 1, and a method having the characteristic features specified in claim 8. Embodiments are the object of the sub-claims.

SUMMARY OF THE INVENTION

According to the invention, the electrodynamic drive system for a vehicle is equipped with a planetary transmission between a drive engine and a manual transmission. The planetary transmission is comprised of the three elements sun gear, internal gear, and planet carrier, of which a first element is connected to the manual transmission, a second element is connected to the drive engine, and a third element is connected to at least one electrical engine. A clutch is equipped with a first position in which a rigid connection exists between the planet carrier and the sun gear for the purpose of bridging the planetary transmission. The clutch has a second position in which the connection between the planet carrier and the sun gear is interrupted. The clutch has a third position, in which a rigid connection exists between the sun gear and a stationary component of the housing. The electrodynamic drive system is further equipped with a control system. In one advantageous embodiment, the third element is connected to a contact-free retarding brake system. One particularly advantageous embodiment shows the retarding brake system as an eddy brake. Another retarding brake system is designed as a hydrodynamic retarder. In one advantageous embodiment the clutch is a dual-action synchronizer with a neutral gear. In another embodiment, the clutch is a dual-action dog clutch with a neutral gear. In a further embodiment, the clutch is a double-sided multi-plate clutch with a neutral gear.

BRIEF DESCRIPTION OF THE DRAWINGS

The invention will now be described, by way of example, with reference to the accompanying drawings in which.

DETAILED DESCRIPTION OF THE INVENTION

Figure 1:
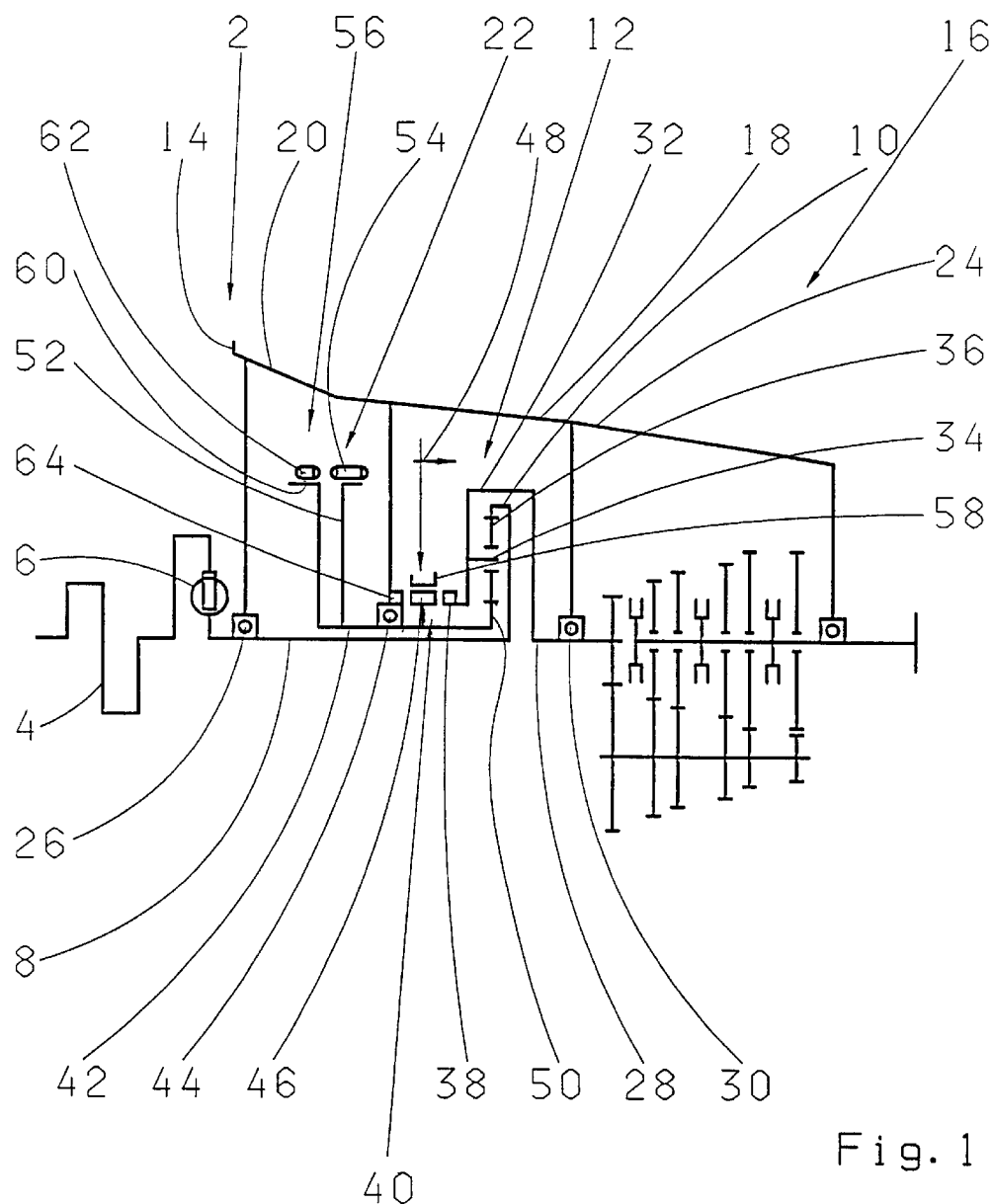
FIG. 1 is a schematic representation of the system.

FIG. 1 shows a sketch of the electrodynamic drive system 2 specified in the invention. A damping device 6 is positioned at the output to a drive engine 4, and is connected via a shaft 8 to the internal gear 10 of the planetary transmission 12.

The planetary transmission 12 is positioned within a section 18 of the housing 14 for the manual transmission 16. In another section 20 of the housing 14, the electric motor 22 is provided. Within a section 24 of the housing 14, the known elements of a manual transmission 16 are housed; these will not be described in any greater detail here. The components 18, 20 and 24 may also be connected as separate housing components to an overall housing 14.

The shaft 8 is mounted in the section 20 of the housing 14, in a bearing 26 such that it can rotate. The input shaft 28 of the manual transmission 16 is mounted in a bearing 30 such that it can rotate, and is rigidly connected to the planet carrier 32 of the planetary transmission 12. Planet gears 36 are mounted on bearing shafts 34 of the planet carrier 32 such that they can rotate. The planet carrier 32 is further equipped with a gearing 38 of a clutch 40, with which the planet carrier 32 can be rigidly connected to a shaft 42. For this purpose the shaft 42, which is mounted in a bearing 44 in the section 18 of the housing 14, is equipped with a synchronizer hub 46 having a sliding sleeve 58, which can be moved by a shifting component 48 in a first shifting direction, and thereby be brought to a first shift position, in a rigid engagement with the gearing of the clutch 38. In this manner a bridging of the planetary transmission 12 is achieved. The sliding sleeve 58 can be moved via the shifting component 48 in a second shifting direction, thereby allowing it to be moved to a second gear position and brought into a rigid engagement with a gearing 64 on the housing 14.

The planetary gears 36 mesh in their gearing both with the internal gear 10 and with a sun gear 50, which is rigidly connected to the shaft 42. The shaft 42 is equipped with the rotor 52 of the electric motor 22 in the section 18 of the housing 14. The stator 54 of the electric motor 22 is mounted in the housing 14. The shaft 42 is also equipped with the rotor 60 of a retarding brake system in the form of an eddy brake 56. The stator 62 of the eddy brake 56 is mounted in the section 20 of the housing 14. The eddy brake 56 serves to provide a contact-free braking of the vehicle, especially over long downhill stretches.

When the vehicle is started, torque is transmitted from the drive system 4 via the shaft 8 to the internal gear 10 of the planetary transmission 12. The eddy retarding brake 56 halts the shaft 42 and thereby the sun gear 50, and in so doing supports the torque introduced by the drive engine against the housing 14. This makes it possible for the torque to be transmitted via the planetary gears 36 and the planet carriers 32 to the input shaft 28 of the manual transmission. At this point the clutch 40 is in the center, neutral position, and the manual transmission 16 is shifted to the starting gear. The shaft 42 is slowed to the crossover, at which point the sliding sleeve 58 is moved to the left in the diagram, and is brought into engagement with the gearing 64 in the housing 14. In this manner, the shaft 42 is blocked, and the drive engine 4 drives the input shaft 28 of the manual transmission 16 via the planetary transmission 12. The drive speed of the drive engine 4 is reduced by the gear ratio reduction of the planetary transmission 12. In shifting to a higher gear, depending upon the wishes of the driver and the driving conditions, either a higher gear ratio may be selected in the manual transmission 16, or the clutch 40 may be switched to its neutral position, whereby the shaft 42 will increase its' speed again via the sun gear 50. With the reduction in the speed of the drive engine 4, the planetary transmission 12 is released. With the contact-free retarding brake system, here in the form of the eddy brake 56, and possibly with the addition of the electric motor 22 as the electric engine, near synchronous speed between the shaft 42 and the planet carrier 32 is achieved. The sliding sleeve 58 of the clutch 40 is then shifted toward the right in the diagram, causing the shaft to be rigidly connected to the planet carrier 32. In this manner, the planetary transmission 12 is bridged and the speed of the drive engine 4 is transmitted directly, without pressure against the input shaft 28 of the manual transmission 16. In either case, with a shifting into another gear, the driving power of the drive engine 4 must be interrupted. If, in place of the gearing 38, 64 and the sliding sleeve 58, a double-sided multi-plate clutch is used, shifting can be achieved without interruption of driving power. In this manner, the gear ratios of the manual transmission 16 can be split up, in which driving with a gear ratio reduction of the planetary transmission 12, and direct driving without gear ratio reduction will alternate.

The electrodynamic drive system becomes an integrated split group. By utilizing the gear ratio reduction of the planetary transmission 12, the retarding brake function of the eddy brake system 56 can be eliminated, since the shaft 42 on which the rotor 52 of the eddy brake system 56 is mounted is blocked against the housing 14.

Figure 2:
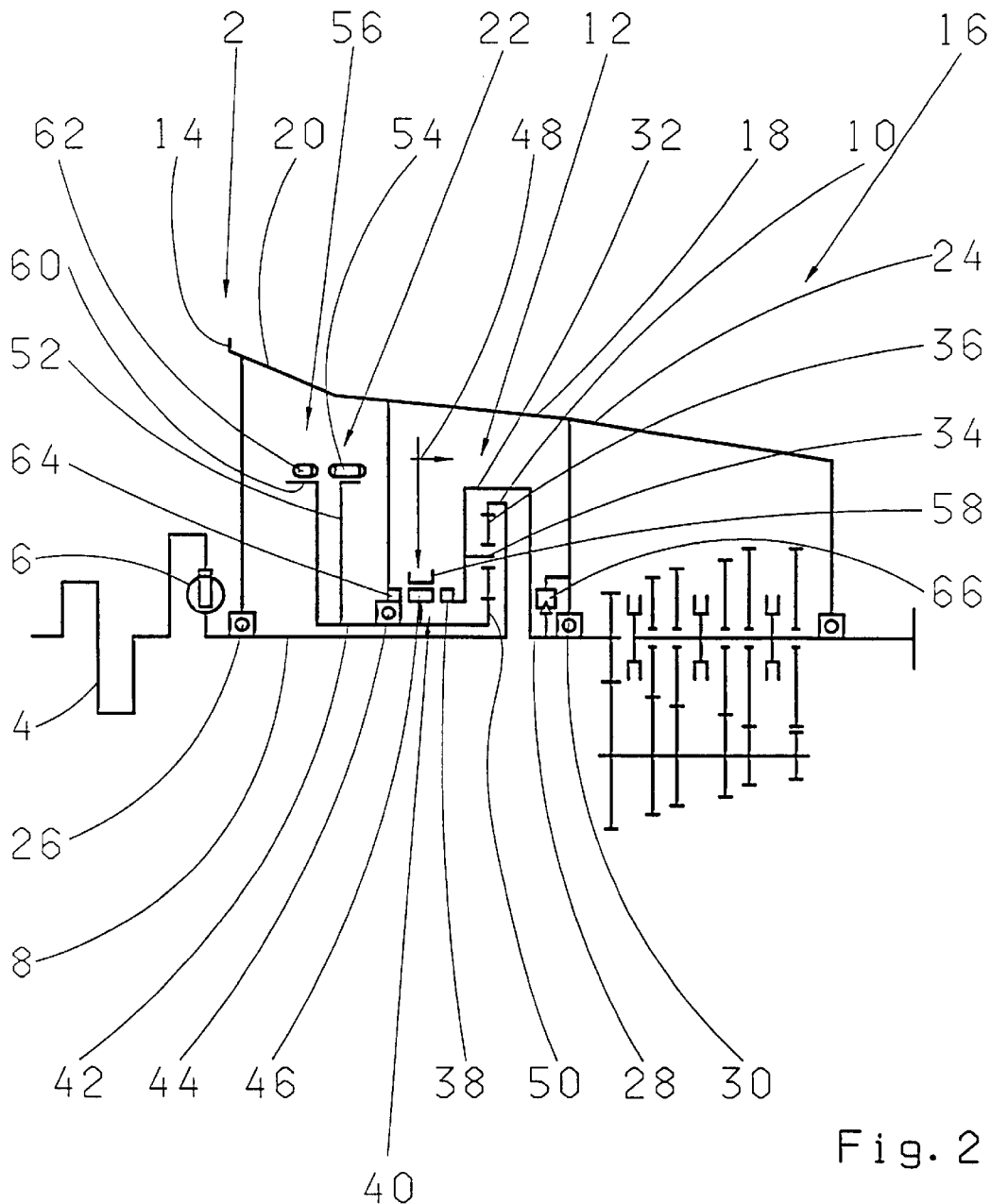
FIG. 2 is a system as illustrated in FIG. 1, with a release.

FIG. 2 shows a configuration as illustrated in FIG. 1, with an overrun release 66 on the input shaft 28 of the manual transmission 16. This release keeps the input shaft 28 from rotating backward when the vehicle is at rest and the drive engine 4 is started by the electric motor 22.

REFERENCE NUMBERS

2 Electrodynamic Drive System
4 Drive Engine
6 Damping Device
8 Shaft
10 Internal Gear
12 Planetary Transmission
14 Housing
16 Manual Transmission
18 Section
20 Section
22 Electric Motor
24 Section
26 Bearing
28 Input Shaft
30 Bearing
32 Planet Carrier
34 Bearing Rods
36 Planetary Gear
38 Clutch Gearing
40 Clutch
42 Shaft
44 Bearing
46 Synchronizer Hub
48 Shifting Element
50 Sun Gear
52 Rotor
54 Stator
56 Eddy Brake System
58 Sliding Sleeve
60 Rotor
62 Stator
64 Clutch Gearing
66 Release

What is claimed is:

1. An electrodynamic drive system (2), for a vehicle, comprising a drive engine (4), a manual transmission (16), with a planetary transmission (12) therebetween, the planetary transmission having a sun gear (50), an annulus (10) and a planet carrier (32), of which the carrier (32) is connected to the manual transmission (16), the annulus (10) is connected to the drive engine (4), and the sun gear (50) is connected to at least one electrical motor (22); a clutch (40) having a first shift position in which a rigid connection exists between the planet carrier (32) and the sun gear (50) for bridging the planetary transmission (12), and a second shift position, in which the connection between the planet carrier (32) and the sun gear (50) is interrupted; a third shift position in which a rigid connection exists between the sun gear (50) and a stationary component of the housing (14); and a control mechanism for the clutch.

2. The electrodynamic drive system according to claim 1, wherein the sun gear (50) is connected to a contact-free retarding braking system (56).

3. The electrodynamic drive system according to claim 2, wherein the contact-free retarding braking system is an eddy brake (56).

4. The electrodynamic drive system according to claim 2, wherein the contact-free retarding braking system is a hydrodynamic retarder.

5. The electrodynamic drive system (2) according to claim 1, wherein the clutch (40) is a dual-action synchronizer (38, 46, 58, 64) having a neutral position.

6. The electrodynamic drive system (2) according to claim 1, wherein the clutch (40) is a dual-action dog clutch (38, 46, 58, 64) having a neutral position.

7. The electrodynamic drive system (2) according to claim 1, wherein the clutch (40) is a double-sided multi-plate clutch having a neutral position.

8. A method for dividing gear ratios in a manual transmission of a vehicle that is equipped with an electrodynamic drive system (2) between a drive engine (4) and the manual transmission (16), having a planetary transmission (12), including a sun gear (50), an annulus (10), and a planet carrier (32), the carrier (32) being connected to the manual transmission (16), the annulus (10) being connected to the drive engine (4), and the sun gear (50) being connected to an electrical motor (22); a clutch (40) that is shifted from a neutral position to a first gear position in order to form a rigid direct connection between the planet carrier (32) and the sun gear (50) for the purpose of bridging the planetary transmission (12), wherein the clutch (40) is shifted from the neutral position into a second gear position, whereby a reduction in the speed of the drive engine (4) corresponding to the transmission ratio of the planetary transmission (12) is achieved.

* * * * *